April 21, 1959     J. G. D. MANWARING     2,883,505

APPARATUS FOR FUSING PLASTIC MATERIAL TO TEXTILES

Filed Sept. 19, 1957

INVENTOR.

Joshua G.D. Manwaring

BY

ATTORNEY

United States Patent Office 2,883,505
Patented Apr. 21, 1959

2,883,505

APPARATUS FOR FUSING PLASTIC MATERIAL TO TEXTILES

Joshua G. D. Manwaring, Needham, Mass.

Application September 19, 1957, Serial No. 684,908

1 Claim. (Cl. 219—10.53)

This invention relates to a method and apparatus for high frequency heating. More particularly, the invention is concerned with the application of high frequency heating to melt a plastic such as is represented by the product commonly referred to as "Mylar," in order to cause the plastic to become bonded to itself or to the surface of some other material such as a textile.

The invention is hereinafter discussed with reference specifically to Mylar, although it is not intended that the invention be limited to this or any other particular plastic or material. Mylar has a relatively low electrical loss as compared to a great many other plastics normally sealed or bonded by high frequency methods. Also, Mylar melts at relatively high temperatures. The combination of these two factors has resulted in Mylar requiring, for sealing or bonding purposes, high frequency heating at what has been up to the present time impractically high frequencies of the order of 100 megacycles or higher.

In using higher frequencies, various problems tend to arise. One of the major problems is that of keeping the high frequency circuit in tune. Any difference in a jig and fixture arrangement or any slight deviation in the material, as well as any change of the slightest degree in operating conditions or any other factors relative to making a seal, can cause a different loading condition so that the high frequency generator is caused to be out of tune with the load. In such case, sealing or bonding becomes non-uniform or inefficient and cold joints, as well as arcing, can result.

It is an object of the present invention to deal with the general problem of sealing or bonding Mylar to itself or to other materials and, specifically, it is an object of the invention to devise a relatively high frequency heating apparatus which can perform a desired heating operation without becoming out of tune.

These and other objects and novel features will be more clearly understood and appreciated from the following description of a preferred embodiment of the invention selected for purposes of illustration and shown in the accompanying drawings, in which.

I have discovered that the problem of satisfactorily applying high frequency heat, of the order of 100 to 150 megacycles or higher, to carry out bonding of Mylar and similar plastics, may be solved by means of novel high frequency circuitry.

The circuitry which I have devised overcomes the problem of the high frequency generator becoming out of tune with the load. My improved circuit is so designed as to greatly broaden the tuning base, as a result of which only very large changes in the limiting factors involved in the load will materially affect the efficiency of the bonding or sealing operation.

I have discovered that a suitably broadened tuning base may be produced by combining two tank coils in parallel with each other and in parallel with stray capacitance found in every circuit. One of the tank coils is, in accordance with the invention, devised to constitute essentially a low reactance path obtained by using an absolute minimum of inductance. Its frequency, therefore, is determined by its inductance plus stray capacitance.

The second tank coil comprises two high inductance, high reactance coils separated by and in series with a suitable capacitor, the net result of which is a reactance similar to but not matching the reactance of the first tank coil. Where the two high inductance coils of the second tank coil meet at the dividing capacitor noted, both coils are separately grounded at their points of junction with the dividing capacitor. An important feature is to employ paths to ground which go through a choke of high reactance and then to ground.

Figure 1:
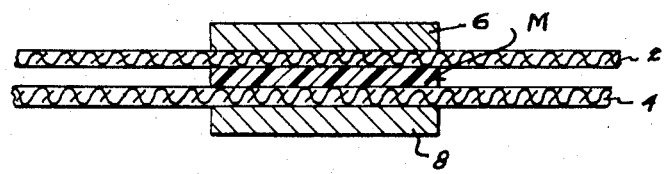
Fig. 1 is a diagrammatic view illustrating in cross-section a method of sealing a body of Mylar between two fabric surfaces in accordance with the invention.

This double tank circuit is connected in a well-known manner to the plates of two tubes whose grids are connected in a conventional push-pull relationship and the output from the double tank coil circuit is fed through two capacitors and then to a pair of electrodes where the load is received. Referring more in detail to the drawings, Fig. 1 is a diagrammatic view in which one form of the method of the invention is illustrated. As noted therein, a body of Mylar M is contained between two layers of sheet material, preferably a fabric, denoted by the numerals 2 and 4. Numerals 6 and 8 refer to electrodes which apply high frequency heating through the fabric to melt the Mylar and cause it to become bonded with adjacent surfaces of the members 2 and 4.

Figure 2:
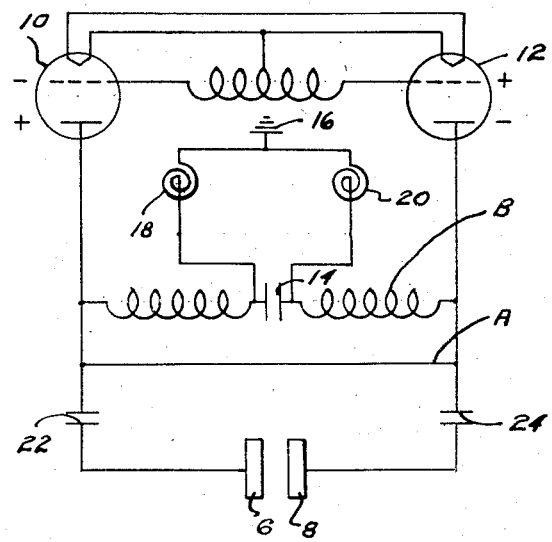
Fig. 2 is a schematic wiring diagram of the electrical circuit for producing high frequency heating in accordance with the invention.

In Fig. 2, there is illustrated the double tank coil circuit of the invention, including tank coil A which has a minimum of inductance and whose frequency is determined by its inductance plus any stray capacitances, and coil circuit B which consists of two high inductance coils in series with a low reactance capacitor 14. The tank coil circuit B is connected to the output of two tubes 10 and 12 connected in push-pull relationship, and the double tank coil circuit is connected in series with a capacitor 14 and provided with separate paths to ground 16, each path including respective chokes 18 and 20. Numerals 22 and 24 denote the capacitors above referred to and connected between the tank coil circuits and the electrodes 6 and 8.

By means of this circuit, I have found that I may achieve a frequency of a maximum commensurate with top rating of the tubes used and tuning problems in the sealing of Mylar, as well as the heating of other substances at these high frequencies, is greatly reduced or, in some cases, completely eliminated.

In the practical application of the circuit to produce bonding or sealing in the manner illustrated in Fig. 1, it is found that it is possible to bond Mylar to various materials and, in particular, fabric or other fibrous bodies. This is particularly the case in connection with applying a strip of Mylar which is desired to be secured in sealed or bonded relationship between two layers of cloth to form a reinforced area. I find that, by varying the mechanics of the Mylar bonding procedure, it is practical to fuse or melt the Mylar to one surface or to a plurality of surfaces, or several pieces or layers of Mylar and fabric can be sealed to one another in laminated relationship and various other arrangements resorted to.

Figure 3:
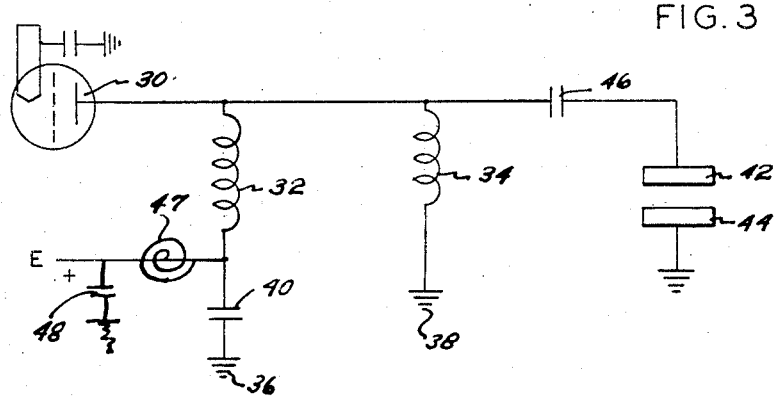
Fig. 3 is a modified form of circuit.

In Fig. 3, I have disclosed a single ended modification of the circuitry of the invention which includes a tube 30, the output of which is supplied to coils 32 and 34 grounded at 36 and 38 with coil 32 being in series with a capacitance 40. Numerals 42 and 44 denote electrodes for receiving a load. The coil 34 is a low inductance coil and the coil 32 is a high inductance and capacitance in series. Numeral 46 refers to an output capacitor. Numeral 47 refers to a high reactance choke and numeral 48 to a conventional RF grounding capacitor to make sure that high frequency does not go back on the plus line.

While I have shown preferred embodiments of the invention, it will be understood that various other modifications and changes may be resorted to within the scope of the appended claim.

Having thus described my invention, what I claim is:

In a dielectric heating apparatus a pair of electrodes, means for energizing the electrodes including a pair of tank coils connected in parallel with one another and comprising an electrical path of low inductive reactance and a second high inductive low capacitive, high reactance path, and vacuum tube means for supplying current to the tank coils, said tank coils comprising two high inductances in series with a dividing capacitance and each of the high inductance coils having connected at their points of termination with the capacitor electrical paths to ground which paths include a choke coil.

References Cited in the file of this patent

UNITED STATES PATENTS

| | | |
|---|---|---|
| 2,124,012 | Smith | July 19, 1938 |
| 2,355,887 | Moule | Aug. 15, 1944 |
| 2,432,412 | Hacklander | Dec. 9, 1947 |
| 2,485,658 | Robertson | Oct. 25, 1949 |